UNITED STATES PATENT OFFICE.

RALPH H. McKEE, OF NEW YORK, N. Y.

METHOD OR PROCESS FOR MAKING FERROZIRCONIUM.

1,401,265. Specification of Letters Patent. Patented Dec. 27, 1921.

No Drawing. Application filed January 17, 1919, Serial No. 271,737. Renewed March 29, 1921. Serial No. 456,691.

*To all whom it may concern:*

Be it known that I, RALPH H. McKEE, a citizen of the United States, residing at New York, in the county of Bronx and State of New York, have invented certain new and useful Improvements in Methods or Processes for Making Ferrozirconium; and I do hereby declare the following to be a full, clear, and exact description of the invention, such as will enable others skilled in the art to which it appertains to make and use the same.

My present invention relates to a novel and improved method or process for making ferro-zirconium.

The process hitherto commercially employed for making ferro-zirconium has involved treating zirconium oxid mixed with iron (or iron oxid) with aluminum at a very high temperature in an electric furnace. The ferro-zirconium of commerce resulting from this process contains a considerable proportion of aluminum, as well as of silicon, the latter resulting from silicate occurring as an impurity in the zirconium oxid. The highest proportion of zirconium found in commercial ferro-zirconium as hitherto produced is little, if at all above 30%. Commonly the proportion of zirconium so found is in the neighborhood of 10%.

It is one object of my invention to produce a ferro-zirconium which shall be free of aluminum, and in which the proportion of zirconium is increased. By the use of my novel process hereinafter described and claimed it is possible to produce a novel compound free from aluminum, wherein the proportion of zirconium is from 20% to 40%, and in which the silicon impurity is greatly reduced.

A typical analysis of my novel product would show, for instance, 20% zirconium, 3% silicon, 0.5% carbon, and the remainder iron. The freedom from aluminum and low percentage of silicon gives a great commercial advantage to my product.

In carrying out my process I mix a native silicate or oxid ore of zirconium with iron and lime and produce fusion either in a resistance electric furnace or in a furnace in which an electric arc is applied to the charge. I prefer to employ fluorspar with the ore and lime, as I find that it promotes a more satisfactory and prompt fusion, while taking no part in any chemical reaction. The ore is used in the form of sand or crushed small and the lime may also be crushed fairly small with advantage.

The iron is generally used in the form of a pure metallic iron, or as cast iron; but I have found that a part of the iron may be replaced by ferro-silicon with the result of accelerating the reaction. No disadvantage will result from this substitution, save possibly a small increase in the percentage of silicon impurity in the finished product.

Several zirconium ores are available for my purposes, and the one of those available in large quantities, and highly suitable in practice, is zircon. This is a zirconium silicate $(ZrSiO_4)$.

In carrying out my process with zircon, a typical charge would be 500 parts by weight of zircon, 250 parts lime, 25 parts fluorspar and 300 parts of iron. This is fused in an electric furnace as heretofore stated. The proportions here given may be greatly varied without departing from my invention.

Another ore which may be used is Baddeleyite, which is a crude native zirconium oxid carrying perhaps 10% of silica. In using this ore different proportions would naturally be used.

The formula above set forth is given as a preferred example and serves as a type. Other ores containing zirconium may be used and the formulas may be varied without departing from my invention.

The lime is used as a flux and is preferred for its cheapness, but one may substitute such equivalents as barium, strontium or magnesium oxid (or even iron oxid may be used) without departing from my invention.

What I claim is—

1. The novel process for producing ferrozirconium, consisting in fusing a zirconium ore with iron and a flux without other reducing agent.

2. The novel process for producing ferrozirconium consisting in fusing a zirconium ore with lime and iron.

3. The novel process for producing ferrozirconium consisting in fusing a zirconium ore with lime, fluorspar and iron.

4. The novel process for producing ferrozirconium consisting in fusing a zirconium ore with lime, iron and ferro-silicon.

5. The novel process for producing ferro-zirconium consisting in fusing a zirconium ore with lime, fluorspar, iron and ferro-silicon.

6. The novel process for producing ferro-zirconium consisting in fusing zircon, lime and iron.

7. The noval process for producing ferro-zirconium consisting in fusing together zircon, iron, lime and fluorspar.

8. The process set forth in claim 7 hereof wherein substantially the following proportions are used in the charge—zircon 500 parts, lime 250 parts, fluorspar 25 parts, and iron 300 parts.

In testimony whereof, I affix my signature.

RALPH H. McKEE.